UNITED STATES PATENT OFFICE.

HARRISON B. MEECH, OF FORT EDWARD, NEW YORK.

IMPROVED PROCESS FOR PRESERVING MEAT.

Specification forming part of Letters Patent No. 59,247, dated October .0, 1866.

*To all whom it may concern:*

Be it known that I, HARRISON B. MEECH, of Fort Edward, in the county of Washington and State of New York, have invented a new and Improved Process for Preserving Meat; and I do hereby declare that the following is a full, clear, and exact description thereof, which will enable others skilled in the art to make and use the same.

This invention consists in subjecting the meat to be preserved or cured to two subsequent operations—viz., to a pressure under water, whereby all the blood and heat are expelled from the same, and it is prepared to receive the antiseptic material; second, after the water has been drained off, the meat is placed in the antiseptic material, which may be used in a liquid or in a gaseous state, and by subjecting the same again to a pressure of sixty (more or less) pounds to the square inch, said antiseptic material is caused to fill the pores of the meat and to cure it in the most perfect manner.

In carrying out my process I dress the meat and take out the bones, in the usual manner. I then place the same in a vessel which is hermetically closed and capable of standing the desired pressure, and force in clear water until I obtain a pressure of about sixty pounds to the square inch, more or less, as may be required, to press out the blood from the meat. After this object has been accomplished, I drain off the water by means of suitable pipes, and then I fill my vessel up with a solution of brine made of a solution of salt, with or without a small percentage of saltpeter, and again apply pressure, so that the brine will be forced through every particle of the meat, and then the meat can be taken out and packed into barrels or cans, or it can be pressed or dried for the market.

Instead of brine, any suitable antiseptic material may be used in carrying out my process, and said antiseptic material may be applied either in a liquid or in a gaseous form.

What I claim as new, and desire to secure by Letters Patent, is—

1. The within-described process of curing meat, by subjecting the same, first, to a pressure under water, and then to a pressure under the antiseptic material used in the process, substantially as and for the purpose set forth.

2. Washing the meat under pressure, substantially as described.

HARRISON B. MEECH.

Witnesses:
WM. F. MCNAMARA,
W. HAUFF.